United States Patent [19]
MacDonald et al.

[11] Patent Number: 6,154,586
[45] Date of Patent: Nov. 28, 2000

[54] OPTICAL SWITCH MECHANISM

[75] Inventors: Robert I. MacDonald, Manotick; Mohiuddin Mala; Karen Stauss, both of Ottawa, all of Canada

[73] Assignee: JDS Fitel Inc., Nepean, Canada

[21] Appl. No.: 09/220,706

[22] Filed: Dec. 24, 1998

[51] Int. Cl.[7] .................................................. G02B 6/26
[52] U.S. Cl. ............................................. 385/18; 385/22
[58] Field of Search .................................. 385/16, 17, 18, 385/19, 22

[56] References Cited

U.S. PATENT DOCUMENTS

| | | | |
|---|---|---|---|
| 4,580,873 | 4/1986 | Levinson | 350/96.2 |
| 4,720,171 | 1/1988 | Baker . | |
| 4,737,019 | 4/1988 | Baker . | |
| 4,988,157 | 1/1991 | Jackel et al. | 350/96.13 |
| 5,042,889 | 8/1991 | Benzoni | 385/16 |
| 5,044,712 | 9/1991 | Soref . | |
| 5,444,801 | 8/1995 | Laughlin | 385/16 |
| 5,555,327 | 9/1996 | Laughlin | 385/16 |
| 5,555,558 | 9/1996 | Laughlin | 385/16 |
| 5,566,260 | 10/1996 | Laughlin | 385/16 |
| 5,566,263 | 10/1996 | Smith et al. . | |
| 5,613,020 | 3/1997 | Uchida et al. . | |
| 5,812,709 | 9/1998 | Arai et al. . | |
| 5,903,687 | 5/1999 | Young et al. . | |

*Primary Examiner*—Frank G. Font
*Assistant Examiner*—Tu T. Nguyen
*Attorney, Agent, or Firm*—Neil Teitelbaum

[57] ABSTRACT

An optical switch mechanism for reflecting an input light beam from an input port to a reflection output port in a first state and for transmitting an input light beam to a transmission output port in a second state is disclosed. The switch mechanism comprises a block made of a light transmissive substrate. The block contains a cavity, which is divided by a light transmissive diaphragm into a reflective portion and a transmissive portion. At the input port a light beam is coupled into the block such that the light beam encounters a reflective surface at an angle greater than a critical angle determined by the refractive indices of the substrate and a reflective fluid retained in the reflective portion of the cavity. When the reflective fluid is in contact with the reflective surface the light beam is totally reflected to a reflection output port. Changing hydrostatic pressure moves the transmissive diaphragm into a position where it is in a touching relationship with the reflective surface and the light beam is then transmitted to a transmission output port. The switch mechanism is simple, reliable, fast and easy to manufacture.

22 Claims, 6 Drawing Sheets

OPTICAL SWITCH MECHANISM

FIELD OF THE INVENTION

The present invention relates to an optical switch mechanism for use in an optical system such as a switching network and in particular to an actuator mechanism for an optical switch.

BACKGROUND OF THE INVENTION

In evolving optical communication networks, the need often arises to switch an optical signal from one path to another, be it along a waveguide or in free space. For example, in a network which consists of a number of communication nodes connected sequentially to form a ring, it may be required to temporarily remove one or more nodes from the network. Therefore the optical waveguides, for example in the form of optical fibres interconnecting the network must be able to "switch" the node(s) from an active (transmit/receive) state to a passive (bypass) state. Many arrangements exist in the art for providing this type of switching. These arrangements may generally be classified into two groups: (1) moving beam switches (arrangements which redirect the optical signal path between stationary waveguides, and (2) moving fibre switches (designs which use external force to physically change the location of optical fibres entering and exiting the node). The switch mechanism of the present invention is used with the switches of the former design.

An exemplary optical fibre switch that utilizes a moving mirror to perform the switching function is disclosed by Levinson in U.S. Pat. No. 4,580,873 issued Apr. 8, 1986 which is incorporated herein by reference. Although this invention appears to adequately perform its intended function, it is believed too costly and somewhat complex. Furthermore, moving the mirror increases the possibility of angular misplacement causing signal distortion or even signal loss.

Another switch of the former design is disclosed by Benzoni in U.S. Pat. No. 5,042,889 and assigned to AT&T Bell Laboratories and issued in 1991. Benzoni's invention relates to an activation mechanism for moving a reflective element in or out of the path of a beam of light, to allow light to be either transmitted in a first position or reflected in a second position. Although Benzoni's design may perform its intended function, there is a need for an inexpensive optical switch.

U.S. Pat. No. 4,988,157 to Jackel et al. herein incorporated by reference, discloses an optical switch having slots at 45 degrees to orthogonal waveguides. The slots are filled with a liquid that matches the refractive index of the waveguides. Electrodes positioned adjacent to the slots form gas bubbles in a selected slot by electrolysis. One of the electrodes catalyses the reformation of the liquid from the bubble components when a voltage pulse is applied. Light in the input waveguides is transmitted through an intersection in the presence of liquid, but is reflected into an output waveguide in the presence of bubbles.

Another optical matrix switch is disclosed in U.S. Pat. No. 4,580,873 to Levinson. This optical switch is formed on a semiconductor substrate. (Grooves are etched at the edges of the substrate to accommodate input and output optical fibers so that the output fibers are placed orthogonal to the light paths of the input fibers. At each cross point defined by the input and output fibers, an electromechanically actuated mirror is provided which in one position permits passage of light from its associated input fiber to a subsequent mirror, and in another position deflects the light to its associated output fiber.

Another type of 1×n optical switch has been disclosed by Laughlin in U.S. Pat. Nos. 5,555,327; 5,444,801; 5,333,175; 5,555,558 and 5,566,260 wherein one input is switched to any of a plurality of output locations or ports by placing a wedged shaped block of glass next to a prism. Although Laughlin's switch may be useful, it appears to have several drawbacks. For instance, the output beams that exit Laughlin's prism are non-parallel and non-orthogonal to the prism face that they exit. It is believed that the coupling of the light exiting at different angles is somewhat difficult. Furthermore, if Laughlin's wedge is moved slightly out of position so that a beam incident upon the wedge goes through a thicker or thinner portion than expected, the beam will not exit exactly where the light is being collected. The assembly of wedges and their actuators is a piece-by-piece process and is not amenable to cost reduction by integrated manufacturing.

All of the prior art switch mechanisms have one or more drawbacks such as being complex, unreliable, slow, inaccurate or expensive for use in optical communication networks.

As telecommunication networks have evolved over the years and have become more complex, a need has arisen for optical switch mechanisms that are simple, inexpensive, reliable and fast. Furthermore, since switch matrices normally include many switch elements a useful switching mechanism has to be compact and amenable to integrated manufacturing. Another consideration for use in a switch matrix is a low energy demand of each of the switch elements.

It is therefore an object of this invention, to provide an optical switch mechanism that is simple, reliable, accurate and fast and amenable to integrated manufacturing.

It is further an object of this invention, to provide an optical switch mechanism that is compact and inexpensive to manufacture.

SUMMARY OF THE INVENTION

In accordance with the invention, there is provided, an optical switch mechanism for reflecting an input light beam from an input port to a reflection output port in a first state and for transmitting an input light beam to a transmission output port in t second state comprising:

a block made of a light transmissive substrate for transmitting the light beam, said block containing a cavity having at least a wall at least a portion of the at least a wall being a switching surface, the switching surface having a first mode of operation in the first state and a second mode of operation in the second state of the switch mechanism;

a light transmissive diaphragm for dividing the cavity into a reflective portion containing a light reflective fluid and a transmissive portion containing a light transmissive fluid, whereby the light reflective fluid has a refractive index smaller than the refractive index of the light transmissive substrate; and, an actuator for switching from the first state, wherein the switching surface is in contact with the light reflective fluid for totally reflecting the light beam, to the second state, wherein the switching surface is in a touching relationship with the light transmissive diaphragm for transmitting the light beam, by moving the light transmissive diaphragm.

In accordance with the invention there is further provided, an optical switch mechanism for reflecting an input light beam from an input port to a reflection output port in a first state and for transmitting an input light beam to a transmission output port in a second state comprising:

a block made of a light transmissive substrate for transmitting the light beam, said block containing a switch cavity and an actuator cavity, whereby the switch cavity comprises at least a wall at least a portion of the at least a wall being a switching surface;

a light transmissive diaphragm for dividing the switch cavity into a reflective portion containing a light reflective fluid and a transmissive portion containing a light transmissive fluid, whereby the light reflective fluid has a refractive index smaller than the refractive index of the light transmissive substrate;

an actuating diaphragm for dividing the actuator cavity into a reflection actuator portion and a transmission actuator portion, whereby the reflection actuator portion is in communication with the reflective portion of the switch cavity and the transmission actuator portion is in communication with the transmissive portion of the switch cavity;

a first capacitor plate for inducing an attractive force on the actuating diaphragm for bringing the switch into the first state when voltage is applied, whereby hydrostatic pressure within the transmissive portion of the switch cavity is reduced and static pressure within the reflective portion of the switch cavity is increased for detaching the light transmissive diaphragm from the switching surface providing totally reflecting conditions at the switching surface; and, a second capacitor plate for inducing an attractive force on the actuating diaphragm for bringing the switch into the second state when voltage is applied, whereby hydrostatic pressure within the transmissive portion of the switch cavity is increased and static pressure within the reflective portion of the switch cavity is reduced for moving the light transmissive diaphragm in a touching relationship with the switching surface providing transmitting conditions at the switching surface.

In accordance with another aspect of the invention, there is provided, a method for reflecting an input light beam from an input port to a reflection output port in a first state and for transmitting an input light beam to a transmission output port in a second state comprising the steps of:

transmitting the light beam through a block of a light transmissive substrate from the input port to a reflective surface, whereby the switching surface is in contact with a light reflective fluid, the light reflective fluid having a refractive index smaller than the light transmissive substrate providing totally reflecting conditions at the switching surface;

totally reflecting the light beam in a first state from the switching surface to the reflection output port;

moving a light transmissive diaphragm into a touching relationship with the switching surface; and, transmitting the light beam through the light transmissive substrate, the switching surface, the light transmissive diaphragm, a light transmissive fluid and again through the light transmissive substrate from the input port to the transmission output port.

An yet still further, there is provided an optical switch mechanism for reflecting an input light beam from an input port to a reflection output port in a first state and for transmitting an input light beam to a transmission output port in a second state comprising:

a block of transmissive substrate for transmitting a light beam, the block having a cavity therein, the cavity bounded by walls including at least two walls comprising reflective surfaces at least one input port for directing the light beam into the block a reflective output port associated with each input port;

a transmissive output port associated with each input port;

a transmissive fluid portion of the cavity separated from the reflective surfaces by at least an elastically deformable membrane;

a reflective fluid portion of the cavity separated from the transmissive fluid portion;

an actuator for switching the optical switch mechanism from a first state to a second state having a reflective fluid reservoir in fluid communication with the reflective fluid portion of the cavity and a transmissive fluid reservoir in fluid communication with the transmissive fluid portion of the cavity and means for changing the hydrostatic pressure in the reflective fluid reservoir and the transmissive fluid reservoir causing the fluids to flow in opposite directions between the actuator and the cavity wherein, in a first state, an increase in pressure in the reflective fluid reservoir causes reflective fluid to flow into the reflective fluid portion of the cavity and the transmissive fluid to flow into the reservoir, separating the elastically deformable membrane from the reflective surfaces allowing reflective fluid to flow between the membrane and the reflective surfaces, and thereby allowing the light beam to pass from the input to the associated reflective output port, and wherein, in a second state, an increase in pressure in the transmissive fluid reservoir causes transmissive fluid to flow into the transmissive portion of the cavity causing the elastically deformable membrane to contact the reflective surfaces, thereby allowing the light beam to pass from the input to an associated transmissive output through the transmissive fluid in the cavity.

BRIEF DESCRIPTION OF THE DRAWINGS

Exemplary embodiments of the invention will now be described in conjunction with the drawings in which:

FIG. 5b is a frontal view of the diaphragm shown in FIG. 5a;

DETAILED DESCRIPTION

Figure 1A:
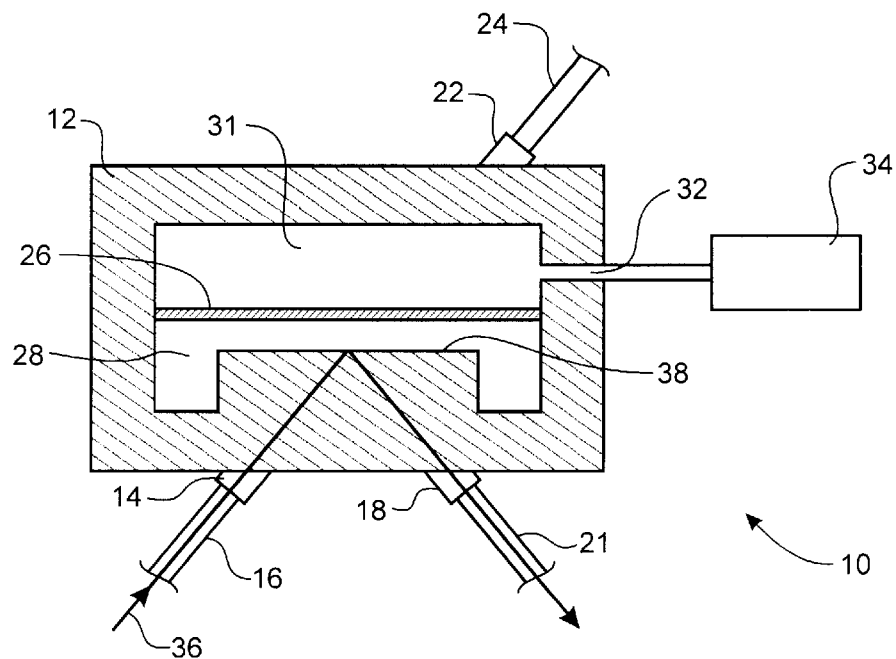
FIG. 1a is a transverse sectional view of an optical switch mechanism according to the invention, wherein an incoming light beam is totally reflected for providing an optical path.
Figure 1B:
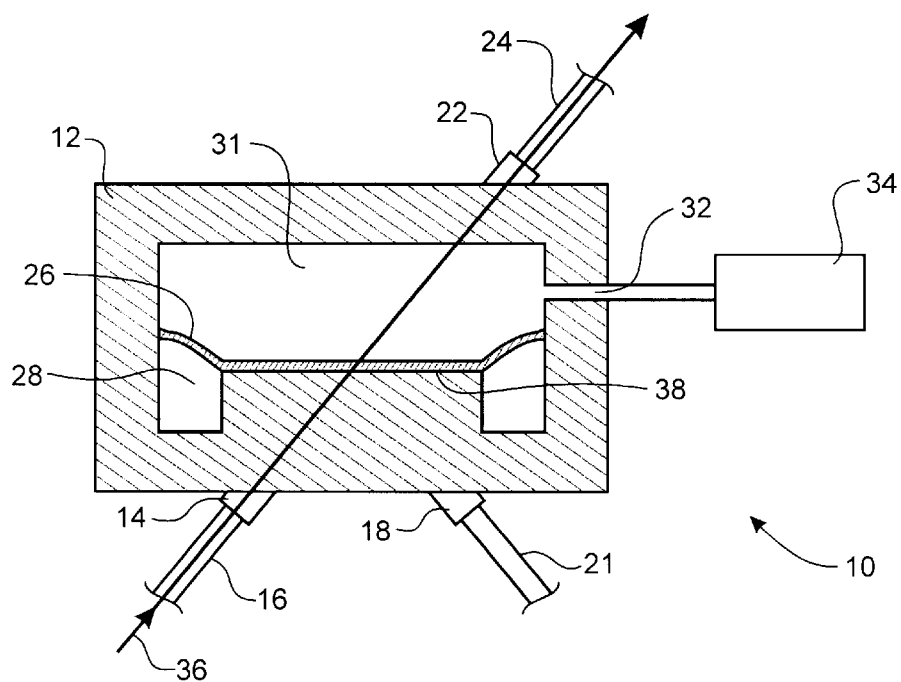
FIG. 1b is a transverse sectional view of an optical switch mechanism shown in FIG. 1a, wherein an incoming light beam is transmitted for providing an alternate optical path.

Referring to FIGS. 1a and 1b an optical switch mechanism 10 according to the invention is shown. The switch mechanism 10 comprises a block 12 made of a light transmissive substrate such as glass. The block 12 comprises a switch cavity which is divided into a reflective portion 28 containing a light reflective fluid and a transmissive portion 31 containing a light transmissive fluid by a light transmissive diaphragm 26 made of an elastic light transmissive material such as a polymer or glass. The transmissive portion of the switch cavity is connected by a connecting channel 32 to an actuator 34 for actuating diaphragm movement. For example, a hydraulic fluid or a gel is used as the light transmissive fluid and air as the light reflective fluid. The actuator 34, for example, comprises a pump mechanism and a reservoir containing the light transmissive fluid. One of the switch cavity walls comprises an optical quality switching surface 38. Optionally, at least a portion of at least a wall of the switch cavity comprises an optical quality switching surface. The switch mechanism further comprises an input port 14, a reflection output port 18 and a transmission output port 22. Each of the ports 14, 18 and 22 is attached to the block 12 for connecting an input fibre 16 and output fibers 21 and 24 to the switch mechanism 10. To ensure proper transmission of a light beam 36 between the fibers and the switch mechanism 10 each of the ports 14, 18 and 22 comprises a graded index (GRIN) lens. An incoming light beam is coupled into the switch mechanism 10 at an angle greater than a critical angle. The critical angle is determined by a refractive index of the light transmissive substrate and a smaller refractive index of the light reflective fluid. As shown in FIG. 1a the incoming light beam is reflected at the switching surface 38 to the reflective output port 18 where the reflected light beam is then coupled into the output fibre 21. In order to minimize signal loss the switching surface has to be of high optical quality and has to be precisely aligned with respect to the input port 14 and the output port 18 to ensure proper total reflection to the output port 18.

Switching the light beam 36 from the reflective output port 18 to the transmissive output port 22 is accomplished by moving the light transmissive diaphragm 26 from a first reflective position to a second transmissive position as shown in FIG. 1a. The light transmissive diaphragm 26 is moved by increasing hydrostatic pressure within the transmissive portion 31 of the switch cavity using the actuator 34. In this position the light transmissive diaphragm 26 is in a touching relationship with the switching surface 38. The light transmissive substrate, the light transmissive diaphragm and the light transmissive fluid have a substantially same refractive index. Therefore, an alternate optical path is established and the incoming light beam is transmitted from the input port 14 to the transmissive output port 22. To ensure proper transmission of the light beam 36 and to minimize signal loss the light transmissive diaphragm 26 has to be in good contact with the switching surface 38, that is there are no pockets of light reflective fluid enclosed between the light transmissive diaphragm 26 and the switching surface 38.

Preferably, the light transmissive substrate, the light transmissive fluid the light transmissive diaphragm have a substantially same refractive index. Having a same refractive index obviates the need for a high quality surface of the light transmissive diaphragm because in this case the light beam is transmitted without being deflected at the contacting surfaces of the different media.

For manufacturing convenience the block 12 comprises two portions affixed one to the other at a connecting plane defined by the light transmissive diaphragm 26, for example, using an adhesive. The reflective portion of the switch cavity is formed such that a volume displaced by the light transmissive diaphragm 26 is substantially smaller than a remaining volume containing the light reflective fluid. Therefore, the light reflective fluid has not to be compressed to a high static pressure allowing movement of the light transmissive diaphragm at a lower hydrostatic pressure of the light transmissive fluid resulting in a lower energy demand to operate the switching mechanism.

Figure 2A:
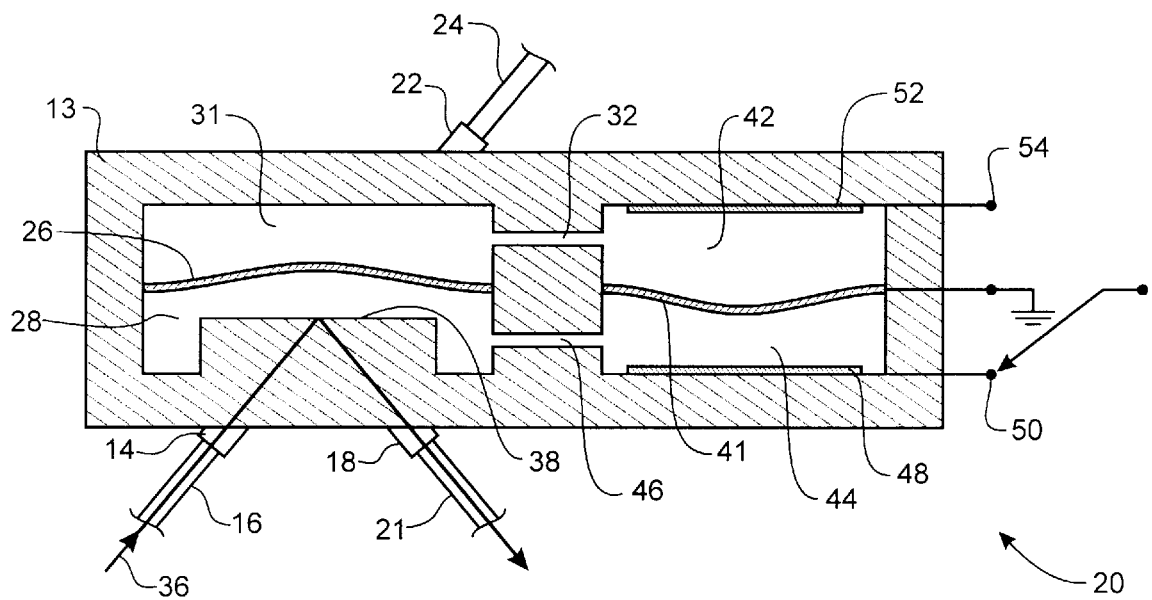
FIG. 2a is a sectional view of an optical switch mechanism comprising an actuating diaphragm and a capacitor plate in a first state.
Figure 2B:
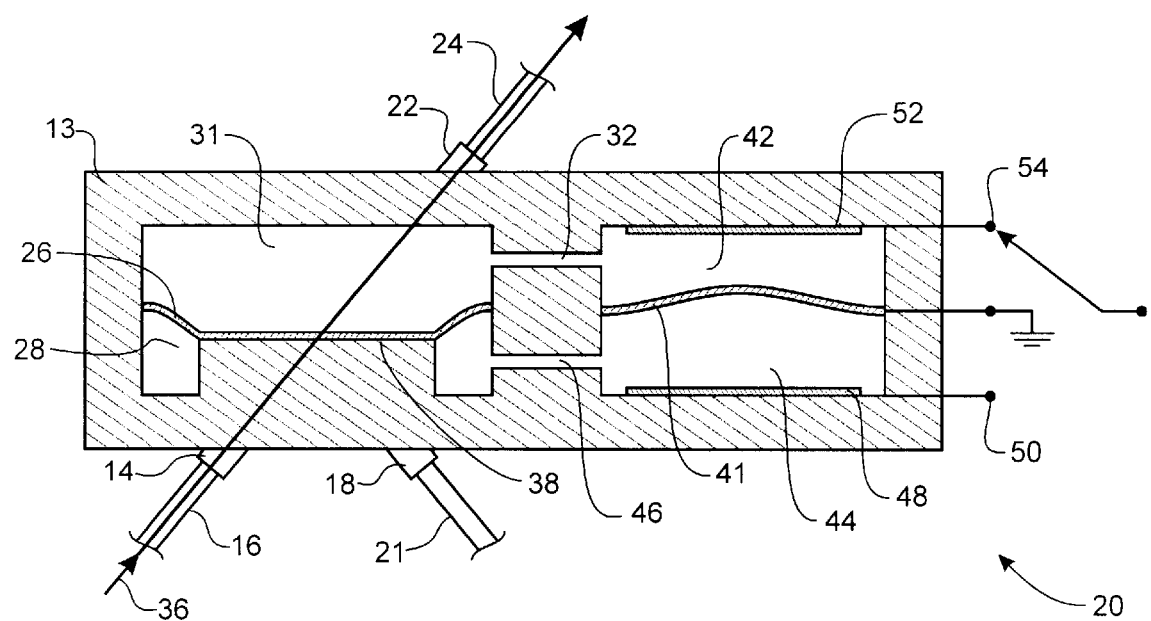
FIG. 2b is a verse sectional view of an optical switch mechanism comprising an actuating diaphragm and a capacitor plate in a second state.

Referring to FIGS. 2a and 2b a preferred embodiment of an optical switch mechanism 20 according to the invention is shown. Here, the block 13 comprises an additional actuator cavity. The actuator cavity is divided by an actuating diaphragm 41 into a reflection actuator portion 44 and a transmission actuator portion 42. Parallel to the actuating diaphragm 41 a first capacitor plate 48 and a second capacitor plate 52 is affixed to actuator cavity walls. The capacitor plates 48 and 52 are connected to electric input ports 51 and 54, respectively. The actuating diaphragm 41 comprises a thin metal sheet connected to ground. Alternatively, the actuating diaphragm 41 comprises a non conducting material with a metallic coating. The transmission actuator portion 42 is connected to the transmissive portion 31 of the switch cavity via the connecting channel 32, whereas the reflection actuator potion 44 of the actuator cavity is in communication with the reflective portion 28 of the switch cavity. FIG. 2a shows voltage applied to the first capacitor plate 48 inducing a force acting on the grounded actuating diaphragm 41 such that the actuating diaphragm is attracted towards the first capacitor plate 48. Movement of the actuating diaphragm 41 reduces the hydrostatic pressure in the transmissive portion 31 of the switch cavity and increases the static pressure in the reflective portion 28 of the switch cavity, thus separating the light transmissive diaphragm from the switching surface 38. In this position the incoming light beam is reflected at the switching surface 38 to the reflection output port 18.

Referring to FIG. 2b voltage is applied to the second capacitor plate 52 inducing an attracting force on the grounded actuating diaphragm 41. The actuating diaphragm 41 is moved towards the second capacitor plate 52 increases the hydrostatic pressure in the transmissive portion 31 of the switch cavity and transports transmissive fluid into the transmissive portion 31 of the switch cavity. Simultaneously the static pressure in the reflective portion 28 of the switch cavity is reduced and reflective fluid is removed from the reflective portion 28 of the switch cavity, thus bringing the light transmissive diaphragm 26 in a touching relationship with the switching surface 38. Therefore, the incoming light beam 36 is then transmitted to the transmission output port 22.

Optionally, the actuating diaphragm is moved by applying a voltage to an induction coil.

This optical switch mechanism is highly advantageous by providing an apparatus that is simple, reliable and easy to manufacture. Only an elastic membrane is moved by electric forces inducing a change of hydrostatic pressure for moving another diaphragm. Another advantage of this mechanism is speed. Switching a light beam from one optical path to another is accomplished in an instance when the applied voltage is changed providing a great advantage over prior art switches where mechanical parts have to be moved in a complex fashion. Furthermore, moving only a diaphragm minimizes energy demand for operating the switch mechanism compared with prior art devices. Another advantage of this switching mechanism is its accuracy. At both positions of the diaphragm the locations of the two possible optical paths of a light beam are not disturbed by mechanical inaccuracies of moving parts. Furthermore, the switching mechanism may be manufactured in a very compact fashion providing one closed housing having only electrical contacts for applying a voltage to the plates which is advantageous for switching matrices comprising a large number of switch mechanisms.

Figure 3:
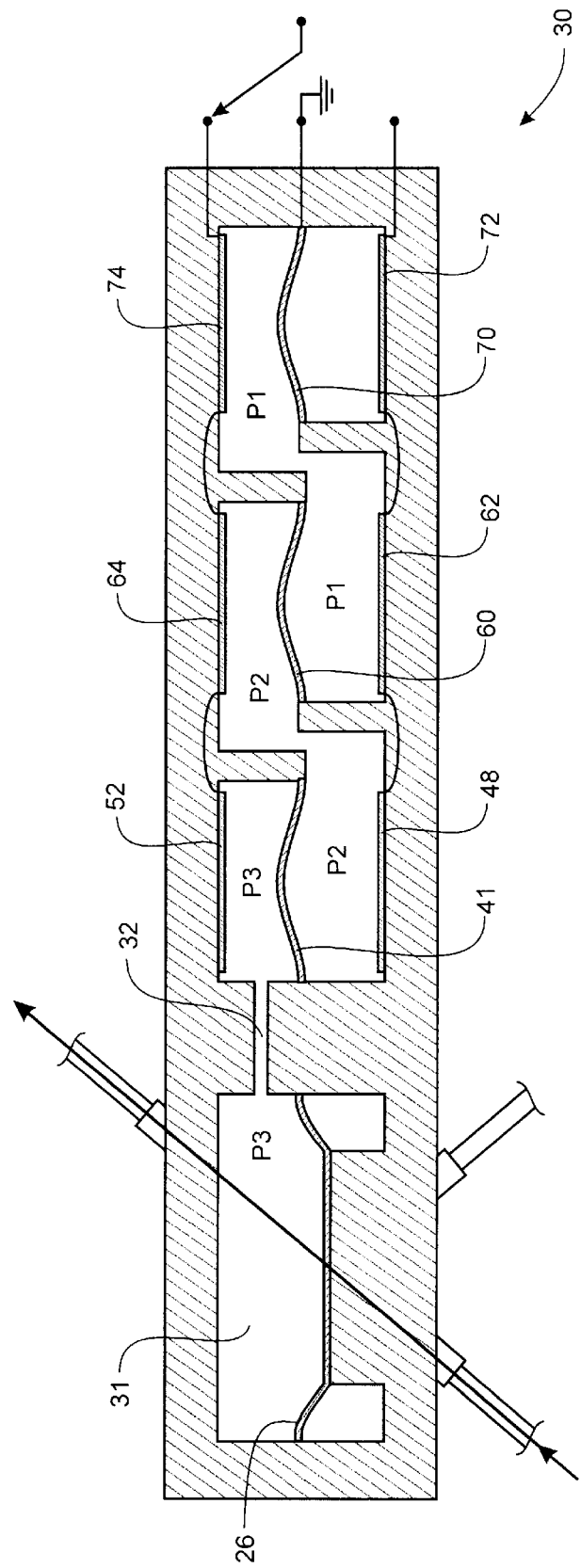
FIG. 3 is a transverse sectional view of an optical switch mechanism according to the invention comprising a plurality of actuating mechanisms connected in series.

The pressure generated by the capacitor plates 48 and 52 depends on the square of the electric field between the capacitor plates 48 and 52 and the actuating diaphragm 41. For convenient values of voltage and distance between the capacitor plates 48 and 52 and the actuating diaphragm 41 insufficient hydrostatic pressure may be generated to operate the switch. In another embodiment of an optical switch mechanism according to the invention several pump mechanisms, each comprising two capacitor plates and a diaphragm are connected in series as shown in FIG. 3. A first stage of such an actuating mechanism comprising capacitor plates 72 and 74 and actuating diaphragm 70 induces a hydrostatic pressure $P_1$. $P_1$ is then increased by action of a second stage comprising capacitor plates 62 and 64 and actuating diaphragm 60 to a hydrostatic pressure $P_2$. Action of a third stage comprising capacitor plates 48 and 52 and actuating diaphragm 41 results in a hydrostatic pressure $P_3$ sufficient to operate the switch. Of course, any number of stages may be connected in series to generate the hydrostatic pressure necessary to operate the switch.

Figure 4A:
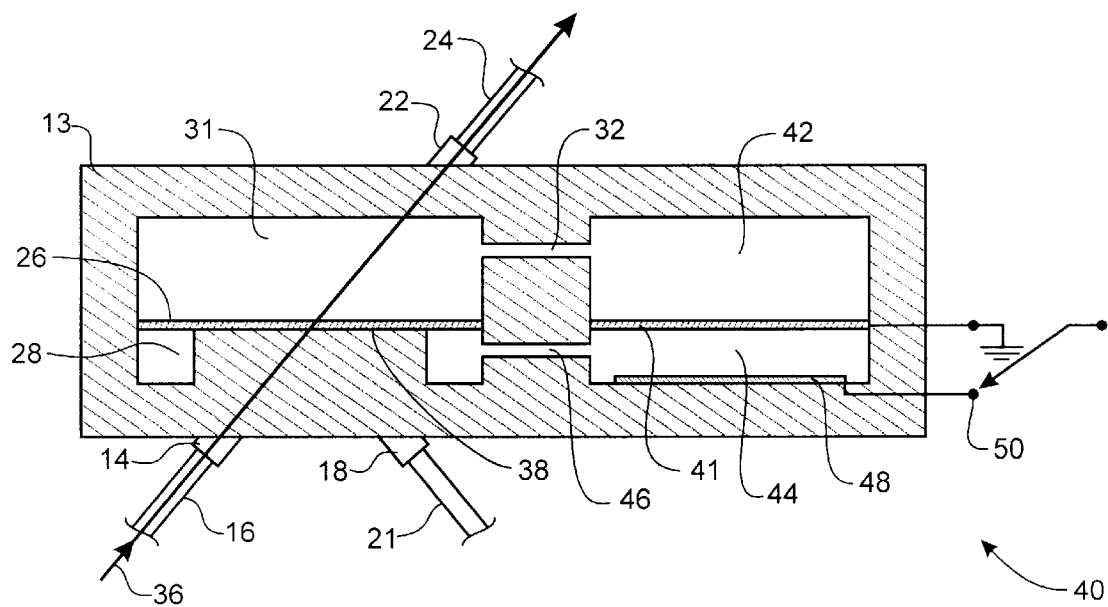
FIG. 4a is a transverse sectional view of an optical switch mechanism, wherein a light beam is transmitted when no voltage is applied.
Figure 4B:
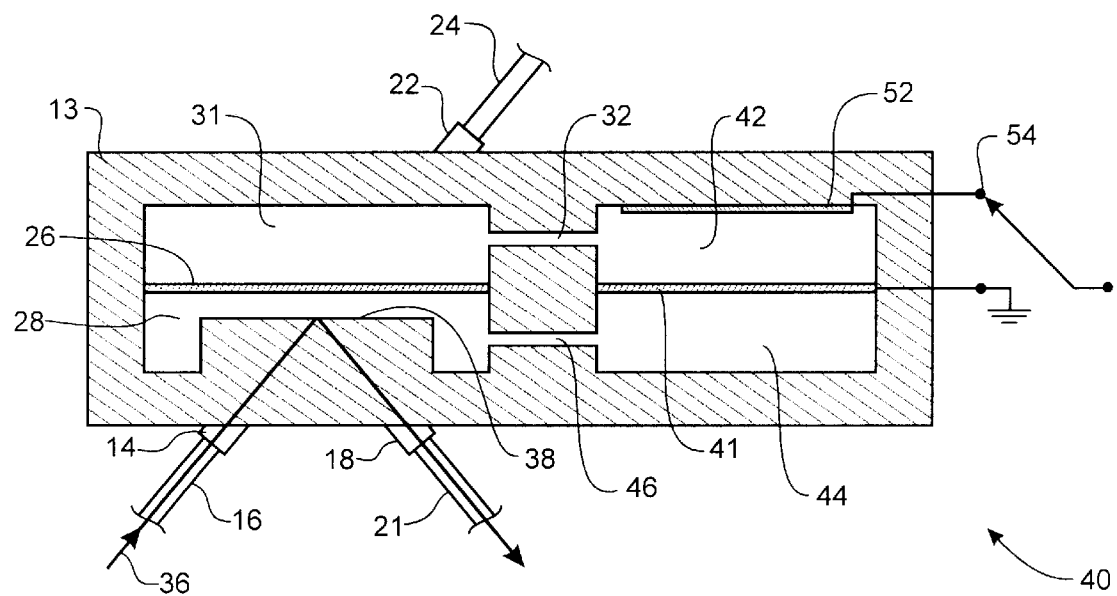
FIG. 4b is a sectional view of an optical switch mechanism, wherein a light beam is reflected when no voltage is applied.

Referring to FIGS. 4a and 4b another embodiment of an optical switch mechanism according to the invention is shown. In the switch shown in FIG. 4a the light transmissive diaphragm 26 is in contact with the switching surface 38 when no voltage is applied. Therefore, a light beam 36 is transmitted. Applying a voltage to a capacitor plate 48 results in a movement of the light transmissive diaphragm out of contact with the switching surface 38 thus the light beam 36 is reflected at the switching surface 38. Alternatively, as shown in FIG. 4b the light beam 36 is reflected at the switching surface 38 when no voltage is applied.

Such a switch mechanism is highly advantageous in applications where one of the optical paths is used for most of the time and a light beam is switched to the other optical path only occasionally. This embodiment provides a switch mechanism wherein one optical path is provided without applying a voltage to the capacitor plates. Therefore energy demand is substantially reduced compared with the embodiment shown in FIGS. 2a and 2b where voltage has to be applied for both optical paths.

Figure 5A:
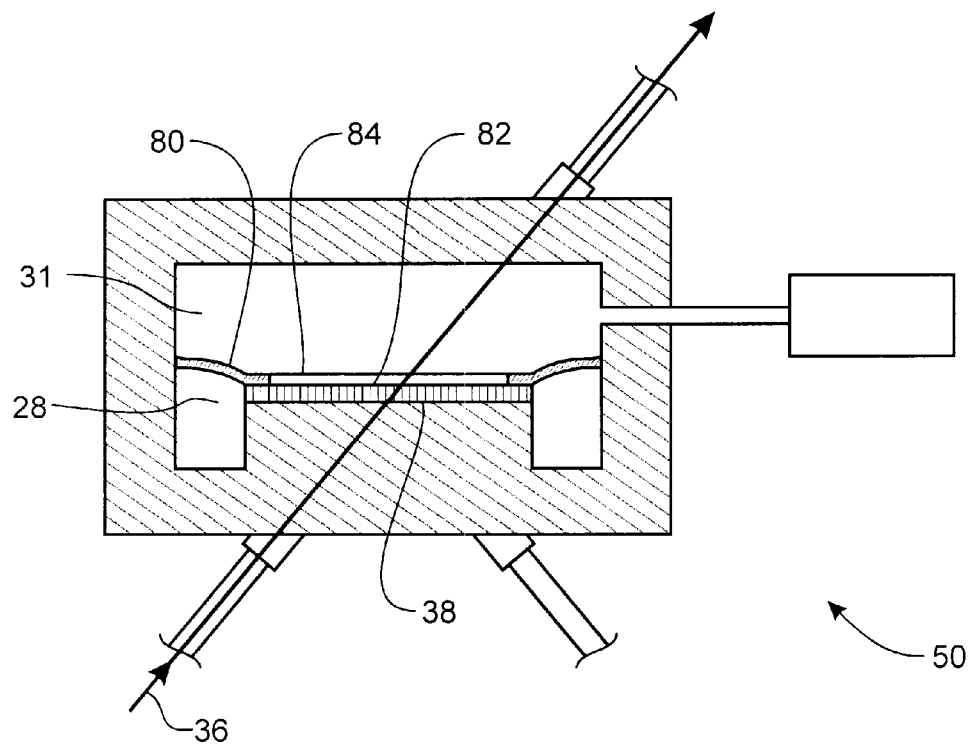
FIG. 5a is a transverse sectional view of an optical switch mechanism according to the invention comprising a transmissive diaphragm, the transmissive diaphragm having an opening covered by light transmissive plate.
Figure 5B:
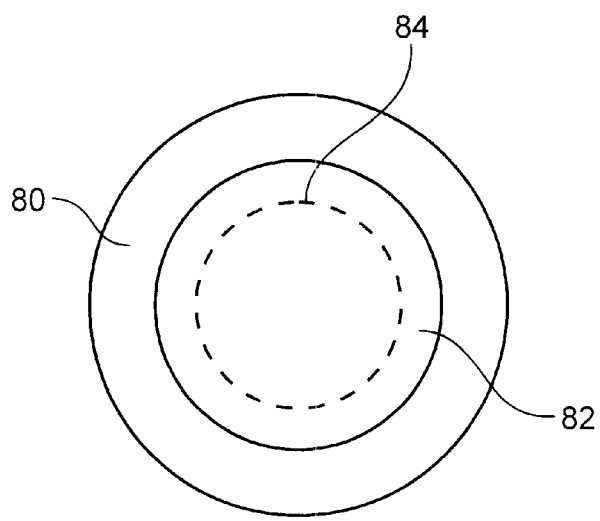

FIGS. 5a and 5b show yet another embodiment of an optical switch mechanism 50 according to the invention, wherein a light transmissive diaphragm 80 is opaque and comprises a light transmissive area 84. For example the light transmissive diaphragm comprises an opening covered by a light transmissive plate 82 such as a glass plate. The plate 82 is affixed to the light transmissive diaphragm 80 using an adhesive such that sealing is provided between the light reflective fluid and the light transmissive fluid.

Optionally, the opaque diaphragm comprises a conductive material such as a metallic sheet and portions of the walls of the cavity parallel to the diaphragm which are not penetrated by the light beam comprise capacitor plates.

This embodiment provides a surface precisely aligned with the reflective surface when in contact with the same and no pockets of reflective fluid can be enclosed between the plate and the reflective surface. Furthermore, it allows use of opaque material for the light transmissive diaphragm.

Figure 6A:
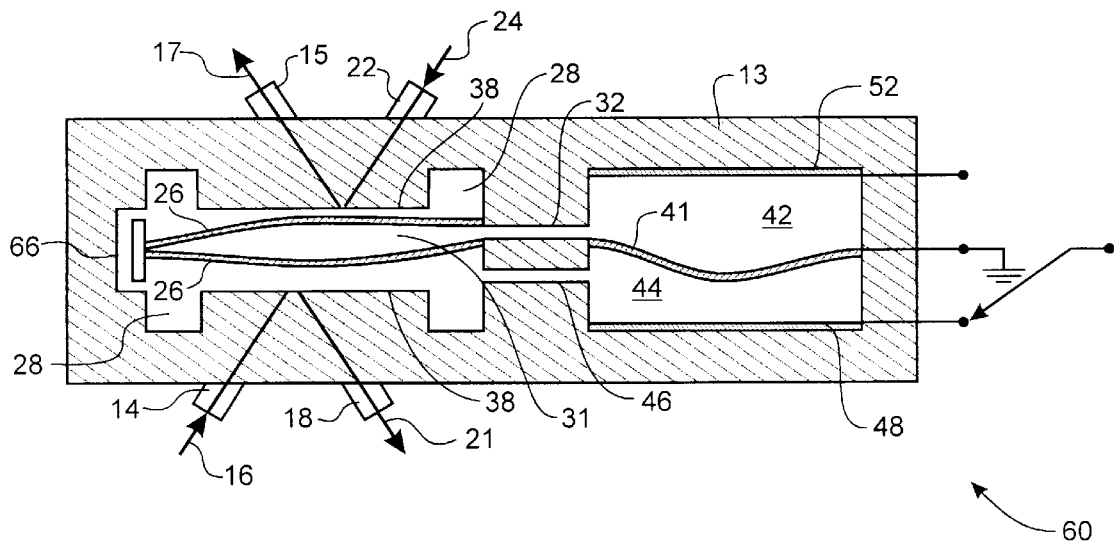
FIG. 6a is a transverse sectional view of an alternative, bidirectional switch mechanism according to mention, wherein a light beam from each of two opposite input ports is reflected to an associated reflective output port pair.
Figure 6B:
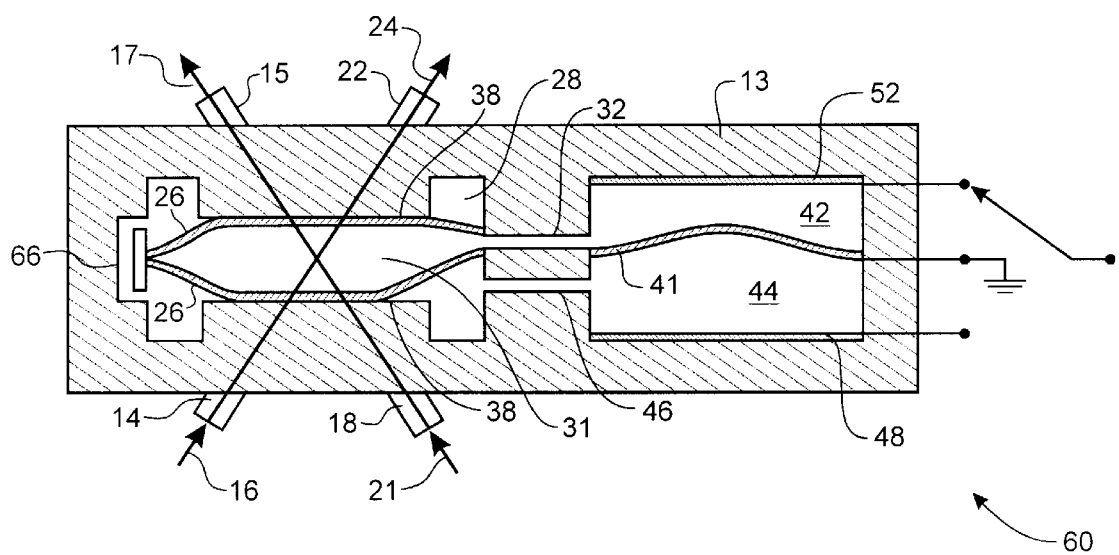
FIG. 6b is a transverse sectional view of the switch mechanism of FIG. 6a, wherein a light beam from each of two opposite input ports is transmitted to an associated transmissive output port pair.

Referring to FIGS. 6a and 6b, an alternative preferred embodiment is shown generally at 60. Here the block 13 includes a switch cavity having two opposite reflective surfaces 38. Transmissive fluid is contained within a transmissive portion 31 of the switch cavity between a pair of elastically deformable transmissive diaphragms 26. Channel 32 connects transmissive portion 31 to the transmissive actuator portion 42 to allow transmissive fluid to flow between switch portion 31 and the actuator portion 42. Reflective fluid surrounds transmissive portion 31. Fluid communication is provided through channel 46 between the switch cavity and the reflective actuator portion 44, and through channel 66 between reflective portions 28 of the switch cavity separated by the diaphragms 26. The switch in this configuration is a 2×2 switch having two input ports 14, 15 and two output ports 18, 22. As the switch element 60 is bidirectional, the function of input and output ports are defined by the direction of signal travel. Each port 14, 15, 18, 22 has an associated reflective pair and an associated transmissive pair. Thus each input port 14, 15 is coupled to both output ports 18, 22, and each output port 18, 22 is coupled to both input ports 14, 15. Due to the separation between reflective surfaces 38, the ports 14, 15, 18, 22 are not perfectly aligned for both reflection and transmission. However, because the separation between the reflective surfaces 38 is very small (on the order of microns) compared to the separation of the ports (on the order of millimeters), the misaligned is small and the loss is acceptable.

FIG. 6a shows a voltage applied to reflective capacitor plate 48 inducing a force acting on actuating diaphragm 41 attracting diaphragm 41 towards capacitor plate 48. Movement of the actuating diaphragm 41 reduces the hydrostatic pressure in the transmissive portion 31 drawing the diaphragms 26 away from the reflective surfaces 38. At the same time pressure in the reflective portion 28 increases. Accordingly, a light beam inserted into any of the ports 14, 15, 18, 22 encounters an interface of differing refractive indices at the reflective surface 38, and is reflected to its associated reflective port pair.

FIG. 6b shows a voltage applied to transmissive capacitor plate 52 inducing a force acting on actuating diaphragm 41, attracting the diaphragm 41 towards capacitor plate 52. Movement of the actuating diaphragm 41 increases hydrostatic pressure in the transmissive portion 31 forcing the diaphragms 26 against the reflective surfaces 38. At the same time pressure in the reflective portion 28 decreases. When the diaphragms 26 are in contact with reflective surfaces 38 with transmissive fluid between them, there is no longer an interface of differing refractive indices. Accordingly, a light beam inserted into any of the ports 14, 15, 18, 22 is transmitted to its associated transmissive port pair.

The invention disclosed herein provides an optical switch mechanism which is simple and inexpensive to manufacture. Furthermore, this mechanism is very reliable in operation because the only moving part is an elastic diaphragm. All switching components are advantageously sealed against environmental effects. Another advantage of this switch mechanism, especially for network applications, is a very short response time. The switch mechanism according to the invention responds substantially in an instant following a change in voltage, to switch a light beam from one optical path to another. Yet another advantage of the switch mechanism according to the invention is that it is possible to manufacture it in a very compact fashion which is advantageous for switching matrices comprising a large number of switches.

Of course, numerous other embodiments may be envisaged, without departing from the spirit and scope of the invention.

What is claimed is:

1. An optical switch mechanism for reflecting an input light beam from an input port to a reflection output port in a first state and for transmitting an input light beam to a transmission output port in a second state comprising:

a block made of a light transmissive substrate for transmitting the light beam, said block containing a cavity having at least a wall at least a portion of the at least a wall being a switching surface, the switching surface having a first mode of operation in the first state and a second mode of operation in the second state of the switch mechanism;

a light transmissive diaphragm for dividing the cavity into a reflective portion containing a light reflective fluid and a transmissive portion containing a light transmissive fluid, whereby the light reflective fluid has a refractive index smaller than the refractive index of the light transmissive substrate; and, an actuator for switching from the first state, wherein the switching surface is in contact with the light reflective fluid for totally reflecting the light beam, to the second state, wherein the switching surface is in a touching relationship with the light transmissive diaphragm for transmitting the light beam, by moving the light transmissive diaphragm.

2. An optical switch mechanism as defined in claim 1, wherein the actuator comprises a pump mechanism and a reservoir containing the light transmissive fluid.

3. An optical switch mechanism as defined in claim 1, wherein the reflective portion of the switch cavity is formed such that a volume displaced by the light transmissive diaphragm is substantially smaller than a remaining volume containing the light reflective fluid.

4. An optical switch mechanism as defined in claim 1, wherein the actuator comprises:

an actuator cavity for actuating movement of the light transmissive diaphragm;

an actuating diaphragm for dividing the actuator cavity into a reflection actuator portion and a transmission actuator portion, whereby the reflection actuator portion is in communication with the reflective portion of the switch cavity and the transmission actuator portion is in communication with the transmissive portion of the switch cavity;

means for inducing a force on the actuating diaphragm, the actuating diaphragm being moved for changing hydrostatic pressure within the transmissive portion of the switch cavity and static pressure within the reflective portion of the switch cavity.

5. An optical switch mechanism as defined in claim 4, wherein the means for inducing a force on the actuating diaphragm comprises a capacitor plate.

6. An optical switch mechanism as defined in claim 4, wherein the means for inducing a force on the actuating diaphragm comprises an induction coil.

7. An optical switch mechanism as defined in claim 1, wherein the refractive indices of the light transmissive substrate, the light transmissive diaphragm and the light transmissive fluid are substantially a same refractive index.

8. An optical switch mechanism as defined in claim 1, wherein the light reflective fluid comprises air.

9. An optical switch mechanism as defined in claim 1, wherein the light transmissive fluid comprises a hydraulic fluid.

10. An optical switch mechanism as defined in claim 1, wherein the light transmissive fluid comprises a gel.

11. An optical switch mechanism as defined in claim 1, wherein the light transmissive diaphragm comprises a polymer or glass diaphragm.

12. An optical switch mechanism as defined in claim 1, wherein the light transmissive substrate comprises glass.

13. An optical switch mechanism as defined in claim 1, wherein the light transmissive diaphragm is opaque and comprises a light transmissive area.

14. An optical switch mechanism as defined in claim 13, wherein the light transmissive diaphragm comprises a conductive material and wherein the switch cavity comprises means for inducing a force on the light transmissive diaphragm.

15. An optical switch mechanism for reflecting an input light beam from an input port to a reflection output port in a first state and for transmitting an input light beam to a transmission output port in a second state comprising:

a block made of a light transmissive substrate for transmitting the light beam, said block containing a switch cavity and an actuator cavity, whereby the switch cavity comprises at least a wall at least a portion of the at least a wall being a switching surface;

a light transmissive diaphragm for dividing the switch cavity into a reflective portion containing a light reflective fluid and a transmissive portion containing a light transmissive fluid, whereby the light reflective fluid has a refractive index smaller than the refractive index of the light transmissive substrate;

an actuating diaphragm for dividing the actuator cavity into a reflection actuator portion and a transmission actuator portion, whereby the reflection actuator portion is in communication with the reflective portion of the switch cavity and the transmission actuator portion is in communication with the transmissive portion of the switch cavity;

a first capacitor plate for inducing an attractive force on the actuating diaphragm for bringing the switch into the first state when voltage is applied, whereby hydrostatic pressure within the transmissive portion of the switch cavity is reduced and static pressure within the reflective portion of the switch cavity is increased for detaching the light transmissive diaphragm from the switching surface providing totally reflecting conditions at the switching surface; and, a second capacitor plate for inducing an attractive force on the actuating diaphragm for bringing the switch into the second state when voltage is applied, whereby hydrostatic pressure within the transmissive portion of the switch cavity is increased and static pressure within the reflective portion of the switch cavity is reduced for moving the light transmissive diaphragm in a touching relationship with the switching surface providing transmitting conditions at the switching surface.

16. An optical switch mechanism as defined in claim 15, wherein a plurality of actuator cavities are connected in series to generate a sufficient hydrostatic pressure for moving the light transmissive diaphragm.

17. An optical switch mechanism as defined in claim 15, wherein the switch mechanism is in the first state when no voltage is applied to the capacitor plates.

18. An optical switch mechanism as defined in claim 15, wherein the switch mechanism is in the second state when no voltage is applied to the capacitor plates.

19. A method for reflecting an input light beam from an input port to a reflection output port in a first state and for transmitting an input light beam to a transmission output port in a second state comprising the steps of:

- transmitting the light beam through a block of a light transmissive substrate from the input port to a reflective surface, whereby the switching surface is in contact with a light reflective fluid, the light reflective fluid having a refractive index smaller than the light transmissive substrate
- providing totally reflecting conditions at the switching surface;
- totally reflecting the light beam in a first state from the switching surface to the reflection output port;
- moving a light transmissive diaphragm into a touching relationship with the switching surface; and,
- transmitting the light beam through the light transmissive substrate, the switching surface, the light transmissive diaphragm, a light transmissive fluid and again through the light transmissive substrate from the input port to the transmission output port.

20. An optical switch mechanism for reflecting an input light beam from an input port to a reflection output port in a first state and for transmitting an input light beam to a transmission output port in a second state comprising:

- a block of transmissive substrate for transmitting a light beam, the block having a cavity therein, the cavity bounded by walls including at least two walls comprising reflective surfaces
- at least one input port for directing the light beam into the block
- a reflective output port associated with each input port;
- a transmissive output port associated with each input port;
- a transmissive fluid portion of the cavity separated from the reflective surfaces by an elastically deformable membrane;
- a reflective fluid portion of the cavity separated from the transmissive fluid portion;
- an actuator for switching the optical switch mechanism from a first state to a second state having a reflective fluid reservoir in fluid communication with the reflective fluid portion of the cavity and a transmissive fluid reservoir in fluid communication with the transmissive fluid portion of the cavity and means for changing the hydrostatic pressure in the reflective fluid reservoir and the transmissive fluid reservoir causing the fluids to flow in opposite directions between the actuator and the cavity
- wherein, in a first state, an increase in pressure in the reflective fluid reservoir causes reflective fluid to flow into the reflective fluid portion of the cavity and the transmissive fluid to flow into the reservoir, separating the elastically deformable membrane from the reflective surfaces allowing reflective fluid to flow between the membrane and the reflective surfaces, and thereby allowing the light beam to pass from the input to the associated reflective output port, and
- wherein, in a second state, an increase in pressure in the transmissive fluid reservoir causes transmissive fluid to flow into the transmissive portion of the cavity causing the elastically deformable membrane to contact the reflective surfaces, thereby allowing the light beam to pass from the input to an associated transmissive output through the transmissive fluid in the cavity.

21. A switch mechanism as defined in claim 20, wherein the configuration of the spacing between the reflective surfaces and the alignment of the ports permits each port to receive transmitted or reflected signals from more than one other port.

22. A switch mechanism as defined in claim 21, wherein the switch mechanism is bi-directional and each port is an input port, a reflective output port or a transmitted output port depending on the direction of the light beam and the state of the switch mechanism.

* * * * *